June 30, 1953 — A. J. HIRST — 2,643,877
INDEPENDENT SUSPENSION FOR MOTOR VEHICLE ROAD WHEELS
Filed March 28, 1951

INVENTOR.
Archie J. Hirst
BY Harness, Dickey & Pierce.
ATTORNEYS.

Patented June 30, 1953

2,643,877

UNITED STATES PATENT OFFICE 2,643,877

INDEPENDENT SUSPENSION FOR MOTOR VEHICLE ROAD WHEELS

Archie John Hirst, Leicester, England

Application March 28, 1951, Serial No. 218,013
In Great Britain April 4, 1950

4 Claims. (Cl. 267—20)

This invention relates to independent suspension for motor-vehicle road wheels in which the suspension system for each wheel includes at least one swinging wishbone link hinged at the outer end to the hub carrying member and at the inner end to the vehicle chassis frame or its equivalent such as a sub-frame or the vehicle body itself where no separate chassis frame exists. The term chassis frame wherever it is used in this specification is intended to include such equivalents.

In the conventional motor-vehicle with front wheel steering the invention is equally applicable to front or rear wheel suspension. In the suspension system of the front road wheels the hub carrying members include the king pin swivels.

In one kind of independent wheel suspension each wheel is supported by a pair of swinging wishbone links, mounted one above the other.

In another form used in front wheel suspension the king pin swivel is mounted on a long radius arm hinged at one end to a point on the chassis frame and stabilized by a transverse link hinged both to the front of the radius arm and to a point on the chassis frame near the centre line of the car. This linkage replaces the lower wishbone link of the previously described kind of suspension but it is usual to fit an upper wishbone link of quite orthodox design which is only lightly loaded.

A further form of independent front suspension uses a bottom wishbone link in conjunction with a telescopic cylinder surrounding the king pin and incorporating the damper and coil spring. The upper end of the telescopic cylinder is hinged to a cross-member on the chassis frame.

The inner and outer hinges of the wishbone links in all these constructions are normally formed by metal bearings but it has been known for parallel rubber bushes to be used. Such bushes are not greatly favoured however.

This unpopularity may be due to increased suspension stiffness but in front suspension systems is generally attributed to errors in steering geometry, due to bush deflections under, for instance, braking or cornering loads, experienced with rubber bushes as they have hitherto been used.

The maximum braking and cornering conditions impose very large axial and radial loads upon the hinges which must be able to withstand them with very little deflection. For stability in vehicle steering any change in geometry as a result of loading must be very slight and in particular change in the inclination of the king pin must be kept to a minimum. Not only must the hinges be made resistant to the axial and radial loads but the outer hinge must be brought as close as possible to the plane of the supported wheel if this result is to be achieved. This requirement imposes severe dimension limitations.

The present invention provides a construction, employing rubber bushes which largely satisfies these demands and may be arranged so as to affect the stiffness of the suspension only slightly when used in conjunction with coil or torsion bar suspension springs.

It is an object of the invention to provide a suspension system for each wheel including at least one divisible swinging wishbone link which on assembly axially pre-compresses opposed conical rubber bushes forming the hinges pivotally connecting the wishbone link by its ends to the chassis frame and/or the hub carrying member.

Another object of the invention is to provide a suspension system having conical bushes of the kind comprising inner and outer metal sleeves with conical confronting surfaces the space between which is filled by a rubber element bonded to the metal.

Alternatively the rubber elements may be bonded to outer metal sleeves only and have an internal bore formed directly in the rubber element.

A further object of the invention is to considerably improve the performance of the rubber particularly in fatigue by pre-compressing the bushes on assembly. The amount of pre-compression is sufficient to ensure that axial and radial loads stress the rubber in compression except when they are abnormally heavy. Pre-compression also removes any tension due to shrinkage of the rubber after vulcanising. The bushes of each pair are preferably close together for the outer hinges but widely separated for the inner hinges.

A still further object of the invention is to provide a suspension system having divisible wishbone links comprising a pair of side members which on assembly are drawn together by a tie rod axially to precompress the conical rubber bushes.

Another object of the invention is to limit the amount of precompression applied to the bushes by means such as shoulders or collars on the tie rods or distance tubes surrounding them.

Yet another object of the invention is to provide the maximum area of material at the plane of greatest bending moment in the hinge pin, whilst maintaining the mean diameter of the rubber bushes as small as possible to reduce torsional stiffness. The side member of the wishbone links may be carried by the ends of a hinge pin supported intermediate its ends from the chassis frame or hub carrying member, as the case may be. Each end of the hinge pin is then tapered or otherwise reduced in cross section and carries a conical rubber bush, mounted with its larger end adjacent the plane of maximum bending moment on the hinge pin due to the overhanging load of the side member, the bush being accommodated in, for example, a housing in the wishbone side member.

In both cases the area of the hinge pin at the smaller end of each conical rubber bush is less than the area necessary to withstand the maximum bending moment so allowing the conical rubber bushes to be of small mean diameter and consequently of low torsional stiffness.

Embodiments of the invention will now be described by way of example with reference to the accompanying drawings in which.

Figure 1:
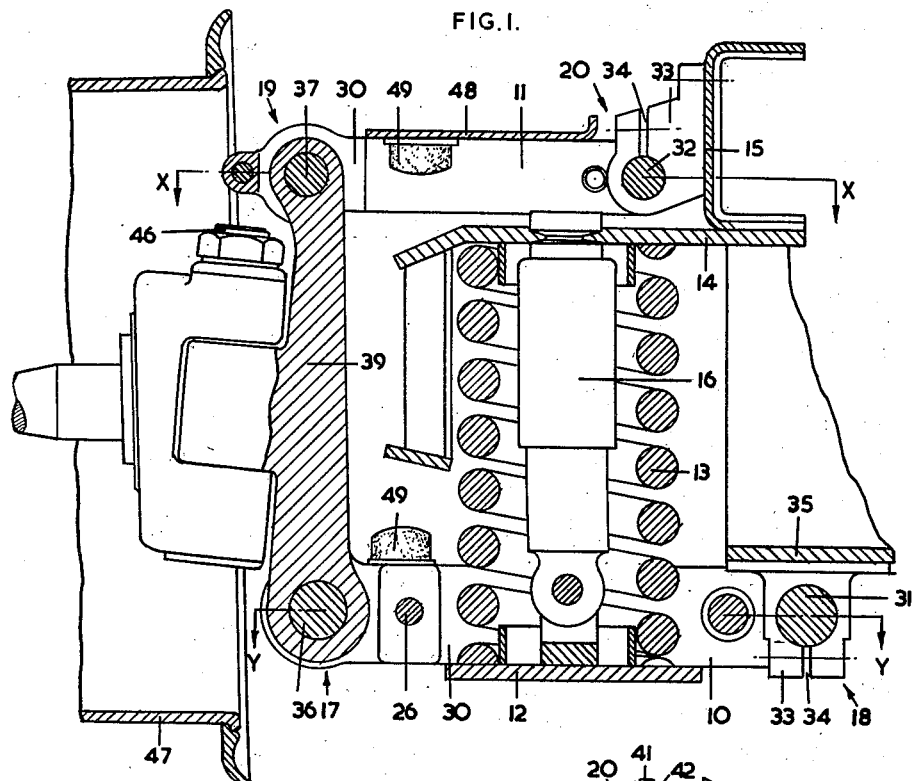
Figure 1 is a sectional elevation of independent suspension system for front road wheels employing upper and lower wishbone links and coil springing.
Figure 2:
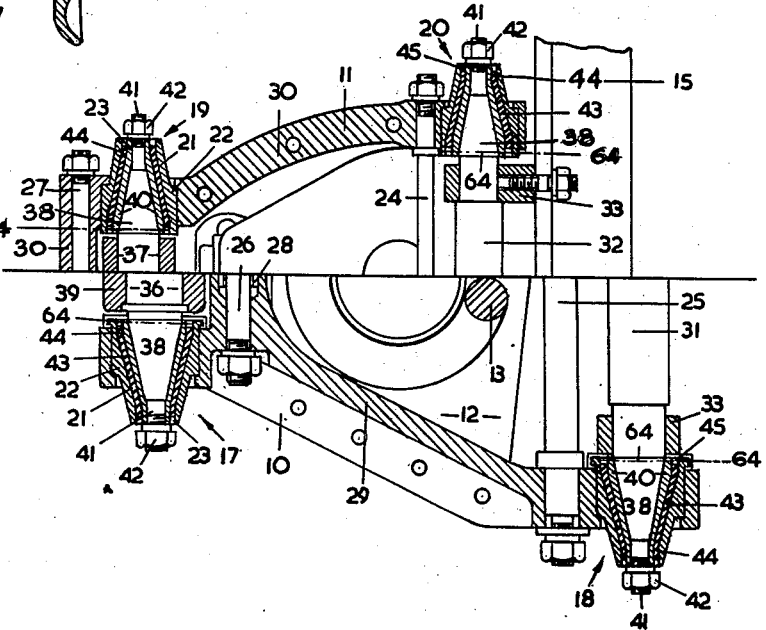
Figure 2 is a plan view partly in section on the line XX of Figure 1 above the centre line of Figure 2 and on the line YY of Figure 1 below the centre line of Figure 2.

In the embodiment according to the present invention shown in Figures 1 and 2 in which a coil suspension spring is used the lower wishbone link 10 is longer than the upper one 11 and has a platform 12 on which the helical compression spring 13 is carried. The other end of the spring engages a bracket 14 projecting from the chassis frame 15. In the centre of the spring 13 is a telescopic vibration damper 16 pivotally secured at one end to the platform 12 and at the other to the bracket 14.

Cornering and braking loads are both applied at the point of contact of the wheel (not shown) with the road surface. Radial loads due to cornering are therefore greater on the lower wishbone link hinges 17, 18 than on the upper hinges 19 and 20.

The reaction of the spring 13 is also taken by the lower wishbone link 10, imposing a further radial load on its hinges 17, 18 which are accordingly designed for twice the load allowed for the upper wishbone link 11 and its hinges 19 and 20. The axial loads due to braking are also far heavier on the lower wishbone link 10. To meet these conditions the bushes 21 are made longer in the lower wishbone link and of slightly greater diameter.

The outer sleeves 22 of the bushes are received in the wishbone links 10 and 11 and their smaller ends are outward. Separate tie rods 24, 25, 26 and 27 close to the hinges are used to complete the wishbone link structures and to precompress the conical bushes 21. Around the outer tie rod 26 only a sleeve 28 is fitted to increase the shear area of the connection between side members 29 and 30 of the wishbone link 10. The load is not sufficient to make this necessary in the upper wishbone link 11.

The hinge pins 31, 32 by which the bushes of the inner hinges 18 and 20 are supported from the chassis frame 15 are each held in the bore of a pair of brackets or mountings 33 which are split at 34 so that the bore may be contracted to grip the hinge pin. The brackets or mountings 33 for the upper wishbone link are attached directly to the chassis frame member 15. Those for the lower wishbone link 10 are supported by a sub-frame 35 below the main chassis frame.

The hinge pins 31 and 32 of the inner hinges and 36 and 37 of the outer hinges 17 and 19 are tapered at the portions 38 overhanging the supports 33 and the hub carrying member 39. The inner sleeves 40 of the conical bushes are fitted on the tapered portions 38. Beyond the taper 38 the extreme ends of each hinge pin are again cylindrical but of reduced diameter and terminate in screw-threads 41 for nuts 42 to retain the inner sleeves 40 in place. The smaller ends 23 of the inner sleeves 40 are also cylindrical and located conveniently on the cylindrical ends of the hinge pins. The taper fit of each inner sleeve 40 on its shaft not only makes a secure joint which is not liable to creep and fretting but also provides a means of angularly adjusting the inner sleeve to put the bush under torsional load in its normal working position so that the rubber is only stressed in one direction under normal loads. Stress is reversed under extreme loads only with consequent benefit in fatigue performance. The bushes 21 may also be adjusted by the same means to equalise their loads.

The actual shape of the rubber element 43 between the inner and outer sleeves is a compromise between conflicting requirements. For constant torsional strain the thickness should be proportional to the radius but for uniform compression strain the thickness should be constant. The final shape is between those two forms.

The rubber elements 43 of all the conical bushes have parallel annular end portions 44. This feature helps to maintain axial and radial stiffness, enables the cylindrical location on the shaft ends to be easily provided and simplifies manufacture. The thin rubber elements and long bonding surfaces give very little opportunity of bulging at the free end surfaces and consequently provide a high radial stiffness but to prevent the rubber bulging over the ends of the metal sleeves under extreme load the free surfaces are stepped back or recessed from these edges as shown at 45.

The taper ends 38 and overhung mounting of the hinge pins and the arrangement of the larger ends of the bushes 21 adjacent the plane 64 of maximum bending moment make small mean bush diameters and thin rubber elements 43 possible without excessive stress on the rubber and with very little effect on the torsional stiffness of the suspension. The small end diameters of the conical bushes at the outer ends of the wishbone links 10 and 11 enable the hinges 17 and 19 to be arranged close to the axis of the kingpin 46 and still clear the brake drum 47 on full lock. This fact coupled with the axial stiffness of the bushes 21 reduces king pin movement to a negligible amount.

The side members 29 and 30 of the wishbone links are connected by flat plates 12 and 48 which provide a platform 12 for the suspension spring and a means of attaching the damper 16 and bump pads 49. They are not necessary for bracing the wishbone link as structures which are stiff enough without them.

This hinge construction can be produced at reasonable cost and results in a much smaller increase in torsional stiffness than rubber bushes at present used on passenger cars. This smaller increase in turn reduces the overall stiffness of the suspension usual in suspensions with rubber bushes and enables economy to be made in the use of spring material or a lower periodicity suspension to be obtained.

These embodiments described above are given by way of example only and may be used as described or in various combinations to suit particular circumstances. These embodiments show how the invention enables the difficulties previously experienced with rubber bushes in independent front suspensions to be overcome and full advantage to be taken of the vibration insulating properties of rubber mountings, their ease of maintenance and absence of wear.

I claim:

1. Independent suspension for a motor vehicle road wheel comprising in combination with a wheel hub carrying member and supporting means on the motor vehicle chassis at least one divisible swinging wishbone link comprising a pair of side members, inner and outer hinge pins, the ends of which are reduced in cross-sectional area and connected to the side members, the hinge pins being supported intermediate their ends, the inner hinge pin by the supporting means on the motor vehicle chassis, and the outer hinge pin by the wheel carrying member, tying means for uniting the side members of the divisible swinging wishbone link, spacing means for preserving the distance apart of the side members, and conical rubber bushes, each conical rubber bush having a rubber element and inner and outer metal sleeves bonded to the rubber element, the conical rubber bushes being mounted one on each end of each hinge pin, their larger ends being inwardly directed and adjacent the plane of maximum bending moment on the hinge pin due to the overhanging load of the side members, the side members being supported on the ends of the hinge pins by the exterior surfaces of the conical rubber bushes, the conical rubber bushes being axially compressed in assembly by the side members of the divisible swinging wishbone link urged together by the tying means, the amount of precompression being limited by the spacing means.

2. Independent suspension for a motor vehicle road wheel according to claim 1 wherein the reduced ends of the hinge pins are tapered and are each received in a complementary tapered bore in the inner sleeve of one of the conical rubber bushes.

3. Independent suspension for a motor vehicle road wheel according to claim 1 wherein the reduced ends of the hinge pin are cylindrical and are each joined to the intermediate portion of the hinge pin by a conical surface, the bore of the inner sleeve of each conical rubber bush being complementary shaped with a hollow conical surface which is clamped against the conical surface of the hinge pin on assembly.

4. Independent suspension for a motor vehicle road wheel according to claim 1 wherein the reduced ends of the hinge pins are cylindrical and are externally screw threaded and are joined to the intermediate portion of the hinge pin by a conical surface, the bore of the inner sleeve of each conical rubber bush being complementary shaped with a hollow conical surface which on assembly is clamped against the conical surface of the hinge pin by a nut engaging the external screw thread on the reduced end of the hinge pin.

ARCHIE JOHN HIRST.

References Cited in the file of this patent

UNITED STATES PATENTS

| Number | Name | Date |
|---|---|---|
| 1,955,841 | Tryon | Apr. 24, 1934 |
| 2,165,033 | Dauben | July 4, 1937 |
| 2,188,952 | Leighton | Feb. 6, 1940 |
| 2,339,533 | Wahlberg et al. | Jan. 18, 1944 |
| 2,344,896 | Phelps | Mar. 21, 1944 |
| 2,556,767 | McCann | June 12, 1951 |